March 29, 1955  T. P. KINN  2,705,286
CONTROL SYSTEMS
Original Filed Oct. 12, 1945
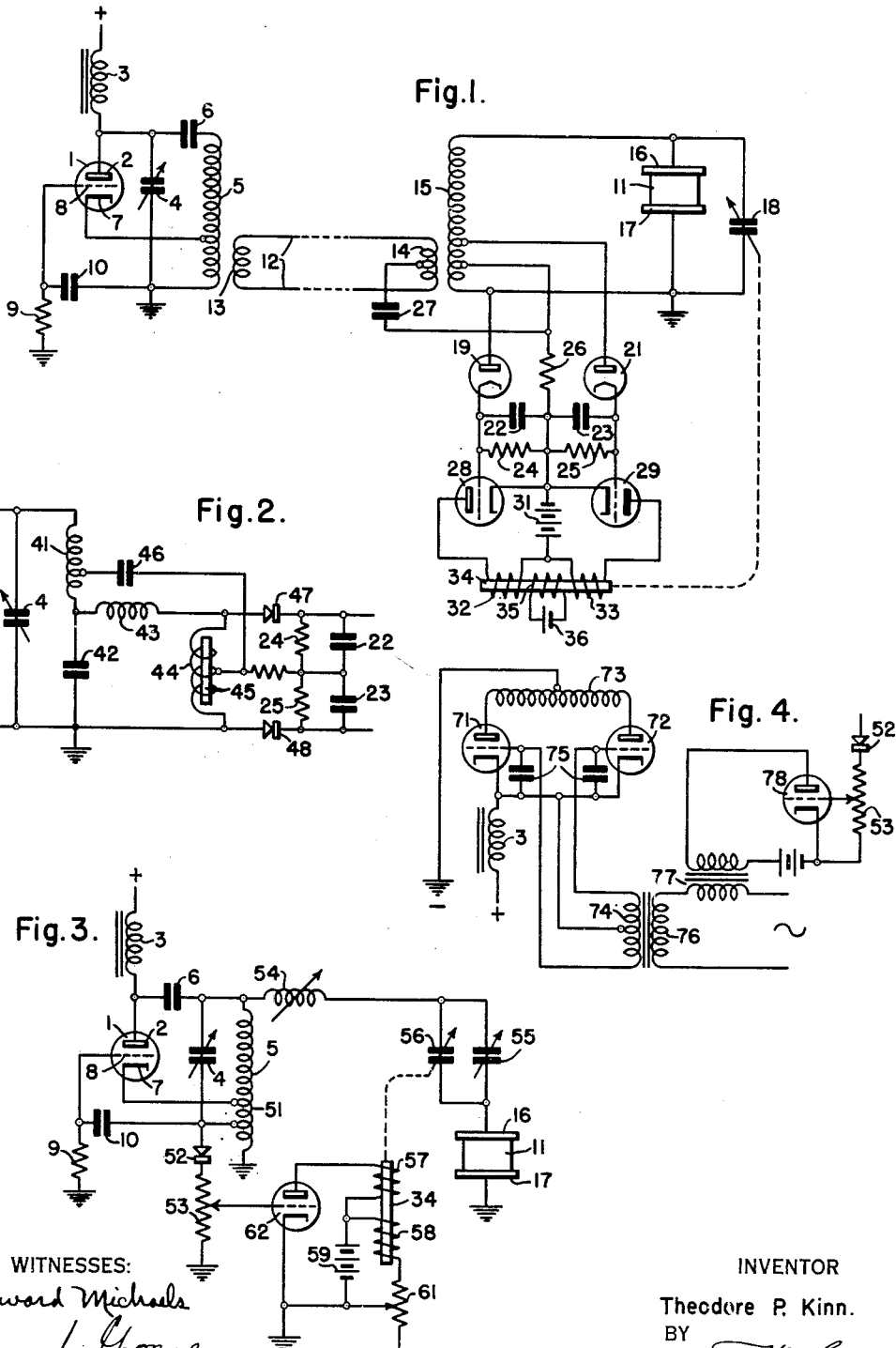
INVENTOR
Theodore P. Kinn.

United States Patent Office 2,705,286
Patented Mar. 29, 1955

2,705,286

CONTROL SYSTEMS

Theodore P. Kinn, Baltimore, Md., assignor to Westinghouse Electric Corporation, East Pittsburgh, Pa., a corporation of Pennsylvania Original application October 12, 1945, Serial No. 622,047, now Patent No. 2,512,336, dated June 20, 1950. Divided and this application August 30, 1949, Serial No. 113,133

4 Claims. (Cl. 250—36)

My invention relates to control systems and, in particular, relates to automatic control systems for maintaining desirable conditions on high frequency heating systems and the like.

This application is a division of my copending application Serial No. 622,047, filed October 12, 1945, for Control Systems, now Patent No. 2,512,336 dated June 20, 1950, assigned to the same assignee as this application.

In recent years, systems comprising high frequency electric generators of a type well-known in the radio art have come into growing use for heating various substances, either by eddy currents induced therein by high frequency electric fields, or by the dielectric losses occuring therein when subjected to the influence of high frequency electric fields. In order to utilize such generators and their connected circuits to the greatest efficiency and otherwise most advantageously, it is usually necessary to have their circuit parameters and constants adjusted to suit the electric and other properties of the load to be heated; for example, it is frequently advantageous to have a circuit of which the load constitutes one element tuned to resonance with the resonant circuit comprising part of an electronic generator or other source of the high frequency power. It is a simple matter to adjust the constants of the generator to suit the electric circuit embodying the load to be heated initially; but as the temperature of the heated substance rises, its dielectric constant, electrical resistance, permeability or other electrical property is likely to undergo change with temperature, thereby altering the values to which the generator or its circuit should be adjusted. For example, alteration of the dielectric constant of the load may change the frequency at which the load circuit naturally resonates.

One object of my invention is, accordingly, to provide an arrangement for automatically adjusting the constants of a high frequency electrical generator or a heating circuit it supplies to maintain a desired relationship between them.

Another object of my invention is to provide an arrangement for automatically regulating the resonant frequency of a high frequency heating circuit and an electric generator supplying current thereto, to maintain desired relationship between them at all times during operation.

Another object of my invention is to provide an arrangement for automatically regulating the resonant frequency of a high frequency heating circuit and an electric generator supplying current thereto, to maintain substantial equality between them at all times during operation.

Still another object of my invention is to provide an automatic system for maintaining the circuit constants of a high frequency load circuit and an electric generator supplying current thereto in such relation to each other as to maintain a substantially constant current in the load circuit.

Still another object of my invention is to provide a system for regulating the direct-current voltage supplied to a high frequency electric generator in such a way as to maintain current of a predetermined magnitude in heating load circuit supplied with current from said generator.

The foregoing and other objects of my invention will become apparent upon reading the following description taken in connection with the drawing, in which:

Figure 1 is a schematic diagram of a high frequency electronic generator supplying current to a dielectric load for heating purposes and provided with regulating means for maintaining a desired relationship, for instance, equality, of resonant frequency between the resonant circuit of the generator and the load circuit in accordance with one embodiment of my invention;

Fig. 2 is a schematic diagram of a modification of the invention of Fig. 1, useful when the load to be heated is a conducting body heated primarily by a high frequency electric current induced therein;

Fig. 3 is a schematic showing of a modification of my invention in which an electronic generator supplying high frequency current to heat a dielectric load is regulated to maintain constant current flow through the load regardless of variations in the electrical and dielectric constants thereof; and Fig. 4 is a schematic diagram of a modification of the circuit of Fig. 3 in which constancy of current flow in a dielectric load is maintained by varying the direct-current voltage supplied to the electronic generator.

Referring in detail to Figure 1, an electronic oscillation generator 1 of any suitable type well-known in the art has an anode 2 connected through a suitable choke coil 3 to the positive terminal of a direct-current source of which the negative terminal is grounded. The anode 2 is likewise connected to ground through a variable capacitor 4 which is shunted by an inductor 5 in series with a second capacitor 6. An intermediate point on the inductor 5 is connected to the cathode 7 of the tube 1 and the control electrode 8 of the tube 1 is connected to ground through a suitable resistor 9 shunted by a capacitor 10.

I have chosen to illustrate the oscillation generator 1 as connected to a heating circuit for a load 11 through a transmission line 12 of any suitable length and form well-known in the art. Power is fed from the inductor 5 to the transmission line 12 through a winding 13 inductively related to the inductor 5, and power is fed from the outgoing end of the line 12 to the load circuit through a primary winding 14 which is preferably in rather loosely-coupled relationship with a secondary winding 15. The load 11, which may comprise a pair of end plates 16, 17, having placed between them any dielectric material which it is desired to heat, is connected directly across the terminals of the winding 15, which terminals are likewise shunted by a variable capacitor 18.

In order to efficiently use the above-described system for heating the load 11, it is usually desirable to have the resonant frequency of the circuit comprising the winding 15 shunted by the dielectric of the load 11 and of the capacitor 18 tuned to resonate at the same frequency as the tank circuit 4, 5, 6 of the generator 1. While it is easy to adjust the capacitor 18 or winding 15 to bring about such resonance at the start of the heating cycle for the load 11, it is generally found that the dielectric constant of the load 11 will change as its temperature rises, thereby disturbing the tuning of the resonant circuit 11, 15, 18. In order to provide an apparatus to automatically adjust the capacitor 18 or the actual capacity of load 11 to maintain resonant tuning between the circuit 11, 15, 18 and the tank circuit 4, 5, 6, I provide a pair of rectifiers 19, 21, of any suitable type having similar electrodes connected to two tap points on the winding 15. The other terminals of the rectifiers 19 and 21 are respectively connected to each other through a pair of capacitors 22, 23 and a pair of resistors 24, 25. The intermediate terminals of the capacitors 22, 23 and resistors 24, 25 are connected together, and likewise connected through the impedance 26 to a point on the winding 15 half-way between the taps to which the rectifiers 19 and 21 are connected. A capacitor 27 is connected between a midpoint of the winding 14 and the last-mentioned tap-point.

The arrangement comprising the elements 19 through 27 constitutes an electric circuit which can be shown to have zero direct-current voltage between the opposite terminals of the resistors 24, 25 when the resonant frequency of the circuit 11, 15, 18 equals the resonant frequency of the tank circuit 4, 5, 6. There will be found between the opposite terminals of the resistors 24 and 25 a direct-current voltage which will depend in polarity upon whether the resonant frequency of the circuit comprising elements 11, 15 and 18 is below that of the resonant frequency of the tank circuit 4, 5, 6 or is above the resonant frequency of the latter. In other words, as long as the resonant frequency of the circuit 11, 15, 18 is the same as that of the tank circuit 4, 5, 6, the voltage difference between the outer ends of the resistors 24, 25 will be zero; but, if the resonant frequency of the circuit 11, 15, 18 falls below that of the circuit 4, 5, 6, a direct-current potential difference will appear between the opposite terminals of the resistors 24, 25 which, over a wide range of frequency difference, will be proportional to that frequency difference. On the other hand, if the resonant frequency of the circuit 11, 15, 18 rises above that of the circuit 4, 5, 6, a direct-current voltage will appear across the opposite terminals of the resistors 24, 25, which is of the reversed polarity to that just described an which will likewise be proportional to the difference in frequencies between the two circuits over a wide range thereof.

By mechanically connecting the adjusting element of the capacitor 18 or winding 15 or load 11 to a suitable electric motor, of which the direction of movement is dependent upon the polarity of the voltage difference between the opposed terminals of the resistors 24 and 25, it is possible to cause such a motor to move the variable element of the capacitor 18 until it reestablishes equality of resonant frequency between the circuit 11, 15, 18 and the circuit 4, 5, 6. One way in which such a motor may be operated is to provide a pair of electronic triodes 28, 29 having their cathodes connected together to the negative terminal of a suitable direct-current voltage source 31. The positive terminal of the direct-current source 31 is connected to the anodes of the tubes 28 and 29 through a pair of magnetizing windings 32, 33, which are arranged to act on a core 34 of suitable magnetic material supported for longitudinal movement through the windings 32, 33. The core 34 is likewise provided with a direct-current polarizing winding 35 fed from a suitable current source 36. The cathodes of the tubes 28, 29 are connected to the common terminal of the resistors 24, 25. The windings 32, 33 and the tubes 28, 29 are so adjusted that, when there is no difference of direct-current potential between the opposite ends of the resistors 24, 25, the current flowing in the tubes 28 and 29 exert equal and opposite pulls on the core 34.

With the arrangement just described, the appearance of a direct-current potential difference between the opposed terminals of the resistors 24, 25, indicative as above described of a departure from resonance of the circuit 11, 15, 18 from equality with the resonant frequency of the circuit 4, 5, 6 will cause an increased current flow through one of the tubes 28 and 29 and a decreased current flow through the other, thereby displacing the core 34. This displacement of the core 34 is arranged to move the variable element of capacitor 18 in the proper direction to bring back equality between the resonant frequencies of the circuit 11, 15, 18 and the circuit 4, 5, 6. When such equality of resonant frequencies is thus again established, the current flow in the tubes 28 and 29 will again be equal and no further movement of the core 34 will take place until such quality again ceases to exist.

While I have shown the motor armature 34 as attached to move the variable member of the capacitor 18, it is obvious that it may instead be attached to move the variable member of the capacitor 4 controlling the tuning of the tank circuit of the generator 1. In such a case, the generator 1 would be continually varied in frequency to equality with the resonant frequency of the heater circuit 11, 15, 18 however much the resonant frequency of the latter might undergo variation in the course of a heating cycle.

While I have shown an arrangement in which the motor device operated by the potential difference between the opposite terminals of resistors 24, 25 moves until resonance is reestablished between the load and generator circuits, it will be realized that by suitably biasing the movable core 34 the arrangement may be made to maintain any predetermined degree of departure from exact resonance in accordance with principles well-known in the art. In a broader aspect my concept is that the discriminator 19, 26 may maintain any predetermined adjustment of the constants or parameters of the genrator and load circuits. For example, the spacing of electrodes holding a dielectric load may be adjusted; or the inductance or capacity of the generator or work circuit; or the coupling between the generator and the work circuit; or the magnitude of the plate or grid voltages; or the wave form of pulsating voltages impressed on the plate or control electrodes of the generator as described in application Serial No. 542,981 of J. R. Boykin filed June 30, 1944, now Patent No. 2,611,091 dated September 10, 1952, and assigned to the assignee of this disclosure.

Fig. 1 thus shows an arrangement for maintaining equality of tuning between a dielectric heating load circuit and the tank circuit of an electronic generator supplying current thereto. However, it is frequently desirable to maintain similar resonance between different portions of the circuit of an electronic generator supplying energy to heat a metallic or other load by currents induced therein through magnetic action of a coil traversed by high frequency current and Fig. 2 shows a modification of my invention adapted to such a purpose.

Since, in the Fig. 2 arrangement, the main circuits of the high frequency generator may be the same as those illustrated in Fig. 1, I have confined the diagram of Fig. 2 to the tank circuit of the oscillation generator and the induction heating load fed thereby. Thus, the tank circuit of the generator may comprise a capacitor 4 similar to the capacitor 4 in Fig. 1, and likewise an inductor 41 in series with a second capacitor 42. The capacitor 42 is shunted by a circuit comprising an inductor 43 in series with the inducing winding 44 of a high frequency electric furnace. The winding 44 surrounds, and is adapted to induce eddy currents in, a suitable load 45 which is to be heated, and which may, for example, comprise a continuously moving strip. The midpoint of the winding 44 is connected through a suitable capacitor 46 to a tap-point on the inductor 41.

To the end terminals of the winding 44 are connected a pair of rectifiers 47, 48 analogous to the rectifiers 19, 21 of Fig. 1. Across the free terminals of the rectifiers 47, 48 are connected two serially connected identical condensers 22, 23, and two serially connected identical resistors 24, 25. The common terminals of the resistors 24, 25 and capacitors 22, 23 are connected together to one end of an impedance 26 of which the opposite end is connected to the midtap of the winding 44.

As in the case of the resistors 24, 25 of Fig. 1, the similarly numbered resistors in Fig. 2 will show, across their opposite terminals, a direct-current voltage which will be zero when the local circuit 42, 43, 44 resonates at the same frequency as the tank circuit 4, 41, 42. Similarly, the direct-current voltage between the opposite terminals of the resistors 24, 25 will be proportional to, and of one polarity, when the resonant frequency of the local circuit 42, 43, 44 is less than that of the tank circuit 4, 41, 42, and of the opposite polarity when the resonant frequency of the local circuit 42, 43, 44 is greater than that of the local circuit 44, 41, 42. As in the case of the Fig. 1 arrangement, the voltage across the outside terminals of the resistors 24, 25 may be used to control a motor regulating the frequency determining elements of either oscillator 1 or load circuit 42, 43, 44 to maintain the resonant frequency of the circuit 4, 41, 42 equal at all times to that of the local circuit 42, 43, 44 in spite of any variations which the latter may undergo by reason of changes in the electrical constants of the winding 44 and the heated load 45 handled thereby. The coupling between the load and oscillator may likewise be controlled by such a motor; for instance, by varying capacitor 42 or inductor 41. In general, the voltage across resistors 24, 25 may make the adjustments discussed above in describing Fig. 1.

Fig. 3 shows another embodiment of my invention in which I illustrate in connection with a high frequency electric generator used to heat a dielectric load 11 analogous to the load 11 described in connection with Fig. 1. The generator tube 1 and the elements connected therewith numbered 2 through 10 are identical with those already described in Fig. 1 and need not be alluded to in detail here. However, there is provided, in inductive relation with the inductor 5 and connected between the end of the latter and the ground, a reactance 51 which may, for example, be a small inductor. The reactance 51 is shunted by a circuit comprising a rectifier 52 in series with a resistor 53.

I have shown the dielectric load 11 connected to the inductor 5, not by a transmission line such as the line 12 in Fig. 1, but by a variable inductor 54 and a pair of variable capacitors 55, 56. The variable element of one of the capacitors 55, 56 is connected in a manner similar to that already described for the variable element of capacitor 18 in Fig. 1, to the core 34 of a reciprocating motor having a pair of suitable windings 57 and 58. The midpoint of the windings 57, 58 is connected to the positive terminal of a direct-current voltage source 59 of which the negative terminal is grounded. The free terminal of the winding 58 is connected to the negative terminal voltage source 59 through a variable resistor 61. The free terminal of the winding 57 is connected to the anode of a triode 62 the cathode of which is grounded. The control electrode of the tube 62 is connected to a tap-point on the resistor 53.

At the initiation of a heating cycle, the current through the load 11, which will readily be seen to likewise flow through the reactance 51, is adjusted to a desired value at which it is intended to be maintained by moving the variable element of the capacitor 55. At the same time, the resistor 61 is adjusted so that the magnetic effect of the windings 57 and 58 on the core 34 exactly balance each other. If, thereafter, the resonant frequency of the circuit containing the load 11, the capacitors 55, 56, the inductors 54, 5 and 51, or any of its other properties, undergoes a change as heating proceeds so that the current flow through the reactor varies from the above-mentioned value at which it has been initially adjusted, the direct-current voltage drop across resistor 53 will vary, thereby impressing a different bias voltage on the control electrode of the tube 62. This will cause a variation in the current through the winding 57 with the result that the core 34 will move in such a direction as to adjust the capacitor 56. Such an adjusting movement will continue until the current through the reactor 51 returns again to its original value, at which time the bias voltage impressed by resistor 53 on tube 62 will return to its original value. In consequence of such return, the current through the winding 57 will again balance the pull of the winding 58 on core 34 and further movement of the variable capacitor 56 will cease.

It will be evident that by varying the bias acting on core 34 in any predetermined desired way the load current may be made to follow any desired program or relationship to the bias controlling quantity.

While I have described in Fig. 3 a modification of my invention in which the adjustment for constant current flow in the heating load is brought about by variation of coupling or other elements in the heating circuit, it is likewise possible to employ the direct-current output voltage drop across the resistor 53 to regulate for constant load current by altering the direct-current voltage impressed upon the plate of the oscillator 1. Fig. 4 shows details of the portion of the circuit in which this direct-current voltage regulation is accomplished. Thus, voltage for the plate of the oscillation generator 2 is obtainable from a pair of grid-controlled rectifier tubes 71, 72 having their anodes fed from the opposite terminals of the secondary winding 73 of a conventional supply transformer. The cathodes of the rectifiers 71, 72 are connected directly through the choke coil 3 to the anode 2 of the oscillator 1 and the midpoint of the winding 73 is connected to ground. Between the cathodes of the tubes 71, 72 and their control electrodes are connected the secondary windings 74 of a peaking transformer shunted respectively by r. f. bypass capacitors 75. Energizing the secondary windings 74 is a primary winding 76 fed from an alternating-voltage source through a saturable reactor winding 77. The magnetic saturation of an iron core for winding 77 is controlled by the plate current of a triode 78 having its grid voltage fixed by the drop across the resistor 53 of Fig. 3. The saturable reactor system just described is well-known in the electronic art for controlling current flow in grid-controlled tubes such as rectifiers 71 and 72. When the Fig. 4 arrangement is employed, the elements 56, 57, 58, 59, 61, 62 and 34 may, of course, be omitted from Fig. 3.

At the initiation of the heating cycle, the current through the load 11 is adjusted to its desired value by variation of the variable capacitor 55. If, at any time thereafter, the current through the load should rise above the desired value, the direct-current voltage drop between the tap or resistor 53 and ground will obviously increase, thereby increasing current flow through the tube 78, and so altering the condition of reactor 77 that the pulses from windings 74 act through the grids to render tubes 71 and 72 conductive later in the alternating-current cycle. As a result, the voltage impressed on the anode of the oscillator 1 will decrease and the latter will furnish less power to the load 11. As a result, the current flow through the load 11 will fall back again to the initial value at which it was desired to maintain it. It is obvious that should the current flow through the load 11 decrease, the voltage drop through resistor 53 will similarly decrease with the result that a more positive voltage on the grids of rectifiers 71 and 72 will cause the impression of increased voltage on the anodes of the oscillator 1. The latter will thus react to return current flow through the load to the value of its initial adjustment.

By connecting the rectifier 52 and resistor 53 across suitable tap-points on an inductor in an induction heating circuit, it is believed obvious, without further explanation, how the methods of Fig. 3 and Fig. 4 may be employed to maintain constant current flow through an induction heating load in a manner analogous to that in which they are applied in Figs. 3 and 4 to maintain constant current flow through a dielectric load such as 11. Alternatively by connecting rectifier 52 and resistor 53 across a tap on the inducing winding on an induction heater, constant voltage may be maintained on said inducing winding.

It is likewise believed to be obvious that the cores 34 in the arrangements of Fig. 1 and Fig. 3 may be used to vary such coupling elements as the windings 13 and 14 of Fig. 1, any frequency determining elements of oscillator 1, resistance 9 in Figs. 1 and 2, the position of the connection from the cathode to inductors 5 in Figs. 1 and 3, or by varying control voltages for induction heating, such as are described in application Serial No. 542,981, of J. R. Boykin, filed June 30, 1944 and assigned to the assignee of this application. By varying the position on resistor 53 of the tap to the grid of tube 78 in any predetermined manner the voltage supplied to the generator may be made to follow any desired program or relationship to the quantity controlling that position.

It is likewise believed to be obvious that the rectifiers 19 and 21 and the capacitor 27 may respectively be connected to the winding 13 and the portion of inductor 5 adjacent thereto instead of to the windings 15 and 14.

I claim as my invention:

1. In combination with a source of electrical oscillations, a load to be heated from energy derived therefrom, a resistance and rectifier connected in series relation with said load and said source, a pair of grid controlled rectifiers supplied with power from an alternating voltage source and connected to supply direct current voltage to said source of electrical oscillations, a circuit drawing power from said alternating source for impressing control voltages on said control grids, an amplifier tube having a control grid, the potential of which is fixed by the voltage drop across said resistance, a saturated reactor for controlling the potential of said control grids, and a direct current winding on said saturated reactor being supplied with current flowing through said amplifier tube.

2. In combination with a source of electrical oscillations, a load to be heated from energy derived therefrom, a resistance and rectifier connected in series relation with said load and said source, a pair of grid controlled rectifiers supplied with power from an alternating voltage source and connected to supply direct current voltage to said source of electrical oscillations, a circuit drawing power from said alternating source for impressing control voltages on said control grids, an amplifier tube having a control grid, the potential of which is responsive to the voltage drop across said resistance, means for controlling current flow to the control grids of said rectifier tubes in response to current flow through said amplifier tube, and means for adjusting the voltage impressed on the control grid of said amplifier tube.

3. In combination, an oscillator for producing electrical oscillations, a load to be heated with energy derived from said oscillator, a resistance and a rectifier connected in series relation with said load and said source, an amplifier tube responsive to the potential across a portion of said resistance, means for supplying an electrical current to said oscillator, means for supplying a control potential for controlling the current supplied by said means for supplying, and connections between said amplifier and said control means for changing the action of said control means in response to the current through said amplifier.

4. Control apparatus comprising a resistance having connections thereto for supplying a current therethrough, an amplifier tube having a grid connected so that the potential applied thereto is responsive to the potential across a portion of said resistance, a saturable reactor, said amplifier tube being connected in series with said saturable reactor, a supply transformer, a grid controlled rectifier, connections for supplying current from said supply transformer through said rectifier to a load, means for supplying an alternating current to a grid of said rectifier, said means including a transmission line having said saturable reactor in series therewith.

References Cited in the file of this patent

UNITED STATES PATENTS

| | | |
|---|---|---|
| 2,175,694 | Jones | Oct. 10, 1939 |
| 2,251,277 | Hart et al. | Aug. 5, 1941 |
| 2,381,057 | Hutcheson | Aug. 7, 1945 |
| 2,391,085 | Crandell | Dec. 18, 1945 |
| 2,415,799 | Reifel et al. | Feb. 11, 1947 |
| 2,416,172 | Gregory et al. | Feb. 18, 1947 |
| 2,454,618 | Stone | Nov. 23, 1948 |
| 2,473,188 | Albin | June 14, 1949 |
| 2,491,822 | Livingston | Dec. 20, 1949 |
| 2,508,321 | Wilmotte | May 16, 1950 |
| 2,545,997 | Hogopian | Mar. 20, 1951 |
| 2,610,288 | Cage | Sept. 9, 1952 |

FOREIGN PATENTS

| | | |
|---|---|---|
| 439,166 | Great Britain | Dec. 2, 1935 |